United States Patent
Kao et al.

(10) Patent No.: US 10,247,292 B2
(45) Date of Patent: Apr. 2, 2019

(54) VEHICLE STARTING CLUTCH-DAMPER ASSEMBLY

(71) Applicant: GM GLOBAL TECHNOLOGY OPERATIONS LLC, Detroit, MI (US)

(72) Inventors: Chi-kuan Kao, Troy, MI (US); Kumar V. Hebbale, Troy, MI (US); Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 15/233,267

(22) Filed: Aug. 10, 2016

(65) Prior Publication Data

US 2018/0045290 A1 Feb. 15, 2018

(51) Int. Cl.
*F16H 3/54* (2006.01)
*F16H 3/58* (2006.01)
*F16H 3/66* (2006.01)
*F16H 57/00* (2012.01)
*F16D 13/00* (2006.01)
(Continued)

(52) U.S. Cl.
CPC ......... *F16H 57/0006* (2013.01); *F16D 13/00* (2013.01); *F16D 41/00* (2013.01); *F16F 15/1206* (2013.01); *F16H 3/66* (2013.01); *F16H 3/666* (2013.01); *F16H 3/54* (2013.01); *F16H 3/58* (2013.01); *F16H 2057/0012* (2013.01); *F16H 2200/0034* (2013.01); *F16H 2200/2005* (2013.01); *F16H 2200/2035* (2013.01);
(Continued)

(58) Field of Classification Search
CPC ...... F16H 3/54; F16H 3/66; F16H 2200/0034; F16H 2200/2005; F16H 2200/2035; F16H 2200/2038; F16H 2200/2066; F16H 2200/2082
See application file for complete search history.

(56) References Cited

U.S. PATENT DOCUMENTS

| 3,053,361 A * | 9/1962 | Hause ................... F16H 47/085 192/12 B |
| 5,513,719 A * | 5/1996 | Moroto .................... B60K 6/24 180/65.21 |

(Continued)

FOREIGN PATENT DOCUMENTS

DE 102009042805 A1 5/2010

*Primary Examiner* — David R Morris
(74) *Attorney, Agent, or Firm* — Quinn IP Law

(57) ABSTRACT

A multi-speed clutch-damper assembly for selectively connecting an output of a power-source to an input of a transmission includes a planetary gear-set. The planetary gear-set is encased in a housing and configured to provide two selectable speed ratios and a damper between the power-source output and the transmission input. The planetary gear-set includes first, second, and third gear members. The second gear member is configured to be connected to the transmission input and the third gear member is configured to be selectively fixed to the housing. The planetary gear-set also includes an elastic element operatively connected to the second gear member and configured to generate torsional vibration damping between the output of the power-source and the input of the transmission. The clutch-damper assembly also includes a first clutch configured to selectively connect the power-source output to the first gear member for transmitting torque of the power-source to the transmission.

16 Claims, 4 Drawing Sheets

(51) Int. Cl.
*F16D 41/00* (2006.01)
*F16F 15/12* (2006.01)
(52) U.S. Cl.
CPC ............... *F16H 2200/2066* (2013.01); *F16H 2200/2082* (2013.01)

(56) References Cited

U.S. PATENT DOCUMENTS

| | | | | |
|---|---|---|---|---|
| 5,562,565 | A * | 10/1996 | Moroto | B60K 6/26 180/65.6 |
| 8,403,806 | B2 * | 3/2013 | Haupt | F16H 3/54 475/311 |
| 8,961,350 | B1 * | 2/2015 | Mellet | F16H 37/022 475/210 |
| 8,992,361 | B2 * | 3/2015 | Doleschel | F16H 3/54 475/312 |
| 2008/0261766 | A1 * | 10/2008 | Koyama | F16H 37/022 475/280 |
| 2009/0253549 | A1 * | 10/2009 | Koyama | F16H 37/022 475/284 |
| 2011/0027105 | A1 * | 2/2011 | Haupt | F16H 3/54 417/53 |
| 2013/0102431 | A1 * | 4/2013 | Doleschel | F16H 3/54 475/151 |
| 2015/0080170 | A1 * | 3/2015 | Mellet | F16H 37/02 475/323 |
| 2017/0184177 | A1 | 6/2017 | Sekiguchi et al. | |

* cited by examiner

US 10,247,292 B2

VEHICLE STARTING CLUTCH-DAMPER ASSEMBLY

TECHNICAL FIELD

The disclosure relates to a starting clutch-damper assembly for a motor vehicle.

BACKGROUND

Modern vehicles typically employ a starting device configured to transfer rotating power from a prime mover, i.e., a power-source, such as an internal combustion engine or electric motor, to a rotating driven load, such as a given vehicle's wheel(s). Such a starting device is frequently arranged between the power-source and a vehicle's transmission and permits power-source torque to be used for moving or starting the vehicle from rest, or, when the vehicle is stationary, permits the power-source to be separated from the driven wheel(s).

In vehicles with parallel-shaft manually and automatically controlled transmissions, such a starting clutch is frequently a mechanically engageable clutch capable of providing a rigid connection between the power-source and the driven wheel(s). Such mechanical clutches typically employ selectively clamped friction disc(s) to affect the connection between the power-source and the transmission.

In vehicles with planetary automatic transmissions such a starting device is frequently a fluid coupling, a.k.a., a torque converter. A key characteristic of torque converters is their ability to multiply torque when there is a substantial difference between input and output rotational speed, thus providing the equivalent of a reduction gear. A torque converter can also be equipped with a selectively locking mechanism to rigidly connect the engine to the transmission when their speeds are nearly equal, to avoid slippage and a resulting loss of efficiency.

SUMMARY

A multi-speed starting or launch clutch-damper assembly for selectively connecting an output of a power-source to an input of a transmission includes a planetary gear-set. The planetary gear-set is encased in a housing and configured to provide two distinct selectable speed ratios and a damper between the output of the power-source and the input of the transmission. Specifically, the two speed ratios can be an underdrive ratio and a direct drive, or 1:1 ratio, between the output of the power-source and the input of the transmission that can be selected during particular operating modes of the transmission. The planetary gear-set includes a first gear member, a second gear member, and a third gear member. The second gear member is configured to be connected to the input of the transmission and the third gear member is configured to be selectively fixed to the housing. The planetary gear-set also includes an elastic element operatively connected to the second gear member and configured to generate torsional vibration damping between the output of the power-source and the input of the transmission. The clutch-damper assembly also includes a first clutch configured to selectively connect the output from the power-source to the first gear member for transmitting torque of the power-source to the transmission.

The first clutch can be a friction-element clutch.

The multi-speed clutch-damper assembly can also include a second clutch configured to selectively fix the third gear member to the housing.

The second clutch can be a one-way clutch, a mechanical diode, or, alternatively, a friction-element clutch.

The multi-speed clutch-damper assembly can also include a third clutch configured to selectively connect the second gear member through the elastic element to one of the first and third gear members.

In the embodiment where the third clutch is configured to selectively connect the second gear member through the elastic element to the first gear member, the starting clutch-damper assembly can additionally include an inertial element connected to the third gear member.

The first gear member can be a ring gear, the second gear member can be a planetary gear-set carrier, and the third gear member can be a sun gear. Alternatively, the first gear member can be a sun gear, the second gear member can be a planetary gear-set carrier, and the third gear member can be a ring gear.

A ratio of a number of teeth of the ring gear to a number of teeth of the sun gear can be in a range of about 1.5-2.0.

The planetary gear-set can include a double-pinion construction. In such a case, the first gear member can be a planetary gear-set carrier, the second gear member can be a ring gear, and the third gear member can be a sun gear. Alternatively, in the double-pinion construction of the planetary gear-set, the first gear member can be a sun gear, the second gear member can be a ring gear, and the third gear member can be a planetary gear-set carrier.

A vehicle employing such a multi-speed clutch-damper assembly for selectively connecting an output of the vehicle's power-source to an input of the vehicle's transmission is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
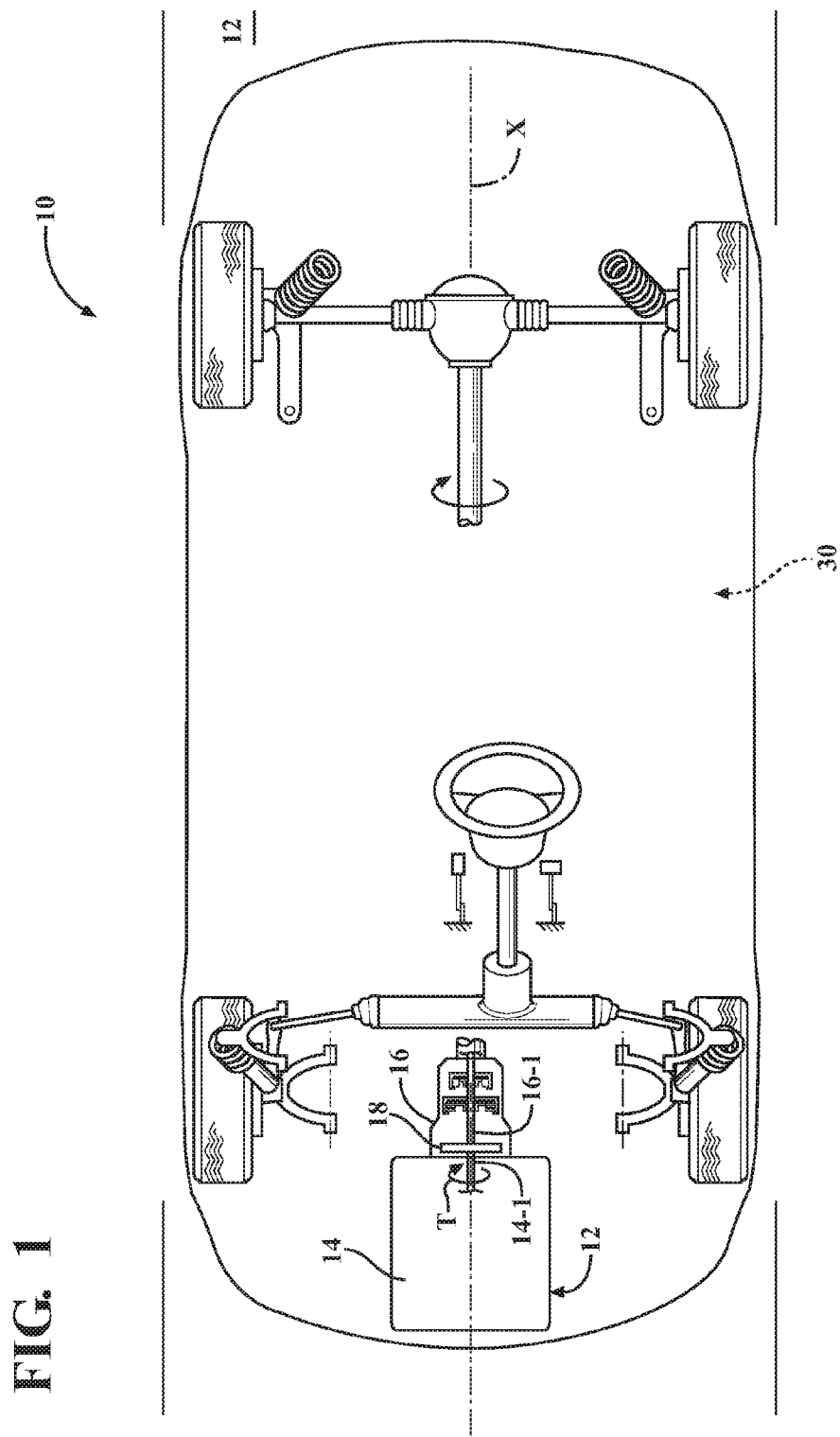
FIG. 1 is a schematic plan view of a motor vehicle having a powertrain according to the disclosure.

Referring to the drawings, wherein like reference numbers refer to like components, FIG. 1 illustrates a vehicle including a powertrain 12 configured to launch, such as start from rest, and propel a vehicle, i.e., to operate the vehicle in all speed ranges between low and high road speeds. The vehicle 10 may include, but not be limited to, a commercial vehicle, industrial vehicle, passenger vehicle, aircraft, watercraft, train or the like. It is also contemplated that the vehicle 10 may be any mobile platform, such as an airplane, all-terrain vehicle (ATV), boat, personal movement apparatus, robot and the like to accomplish the purposes of this disclosure.

The powertrain 12 includes at least one power-source 14 configured to generate a power-source torque T. The powertrain 12 can be configured as a conventional powertrain, i.e., using an internal combustion engine as a prime mover, i.e., the sole power-source 14 of the vehicle 10. Alternatively, the powertrain 12 can be configured as a hybrid powertrain that includes multiple coordinated power-sources 14, such as the internal combustion engine and one or more electric motor/generators (not shown). Although the vehicle 10 may include a plurality of power-sources 14, for simplicity, the remainder of the present disclosure will concentrate on an embodiment of the powertrain 12 using a single power-source.

The powertrain 12 also includes a transmission 16, which can be a transmission of any known configuration, such as a single range transmission, shiftable multi-step transmission, or a step-less continuously variable transmission (CVT) to transmit torque from power-source(s) 14 to one or more driven wheels (not shown) of the vehicle 10. As understood by those skilled in the art, a multi-step type of a transmission 16 can be configured as a manual transmission, i.e., one in which shifting between discrete speed ranges is accomplished manually by an operator of the vehicle 10, or an automatic transmission, i.e., one in which shifting between discrete speed ranges is accomplished automatically, such as via a programmed electronic controller.

The powertrain 12 also includes a multi-speed clutch-damper assembly 18 for selectively connecting an output 14-1 of the power-source 14 to an input 16-1 of the transmission 16. As understood by those skilled in the art, each of the output 14-1 of the power-source 14 and the input 16-1 of the transmission 16 can be configured as bearing supported torque shafts with splined connections to driveline components that will be discussed in detail below. Due to its position between the power-source 14 and the transmission 16, the clutch-damper assembly 18 is configured to serve as a starting or launching clutch-damper assembly for the vehicle 10. Additionally, the clutch-damper assembly 18 provides absorption of the torsional vibration in a torque-transmitting path between the power-source 14 and the transmission 16. Such absorption of torsional vibration in the powertrain 12 serves to decrease noise, vibration and harshness (NVH) characteristics of the vehicle 10 and enhance overall comfort, of the vehicle's passengers.

Figure 2:
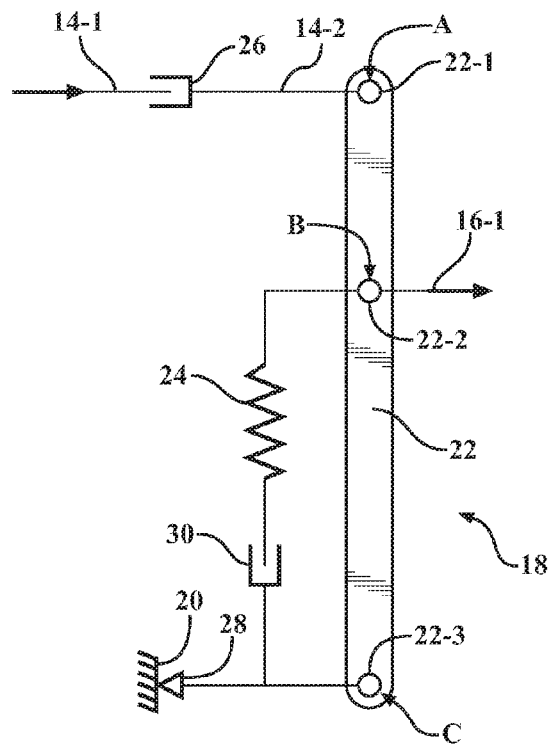
FIG. 2 is a schematic lever diagram illustration of a multi-speed starting clutch-damper assembly employed as part of the powertrain shown in FIG. 1 according to one embodiment.
Figure 3:
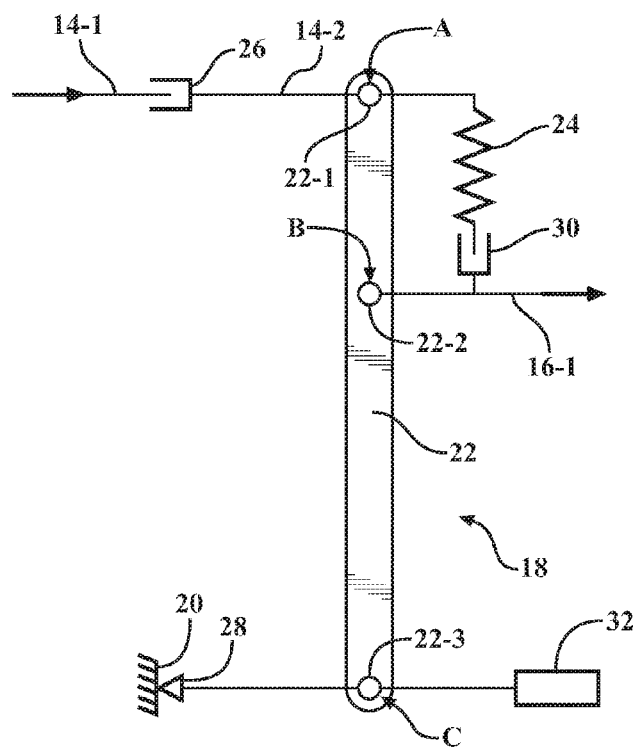
FIG. 3 is a schematic lever diagram illustration of a multi-speed starting clutch-damper assembly employed as part of the powertrain shown in FIG. 1 according to another embodiment.

The multi-speed clutch-damper assembly 18 is represented in lever diagram form in FIGS. 2 and 3. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

As will be described in detail below, the clutch-damper assembly 18 is configured to provide two distinct selectable speed ratios, one being an underdrive ratio for effective launching of the vehicle 10, and a direct drive, or 1:1 ratio, between the output 14-1 of the power-source 14 and the input 16-1 of the transmission 16. As shown in FIGS. 2 and 3, the clutch-damper assembly 18 includes a housing 20 and a planetary gear-set 22 encased therein. The housing 20 retains lubricants, supports the internal components, i.e., various shafts, bearings, and the gear-set 22, and keeps contamination and external elements away. The clutch-damper assembly 18 is configured to provide a two-speed damper between the output 14-1 of the power-source 14 and the input 16-1 of the transmission 16. The planetary gear-set 22 includes a first gear member 22-1, a second gear member 22-2, and a third gear member 22-3. The first gear member 22-1 is configured to be selectively connected to the output 14-1 from the power-source 14. The second gear member 22-2 is connected to the input 16-1 of the transmission. Additionally, the third gear member 22-3 is configured to be selectively fixed to the housing 20.

The clutch-damper assembly 18 also includes an elastic element 24 operatively connected to the second gear member 22-2 and either the first gear member 22-1 or the third gear member 22-3. Such an arrangement of the elastic element 24 is thereby configured to generate torsional vibration damping between the output 14-1 of the power-source 14 and the input 16-1 of the transmission 16. The elastic element 24 may include a plurality of compression springs (not shown). In order to provide the requisite damping, such compression springs may be positioned between separate spring engagement elements (not shown), one of which can be connected to the second gear member 22-2 while the other can be connected either to the first gear member 22-1 or the third gear member 22-3. It is intended that the elastic element 24 be compressed by relative angular rotation between the respective spring engagement elements, as the subject spring engagement elements are rotated relative to each other. Accordingly, absorption of torsional vibration generated by the power-source 14 is achieved in part by compression and subsequent expansion of the compression spring embodiment of the elastic element 24, which store the energy received by angular rotation between the respective spring engagement elements.

A first clutch 26 is configured to selectively connect the output 14-1 from the power-source 14 to the first gear member 22-1 for transmitting the power-source torque T to the transmission 16. Accordingly, the first clutch 26 is configured to operate as a launch clutch for the vehicle 10. The first clutch 26 can be configured as a friction-element, such as a wet-friction, clutch, where the friction elements operate immersed in a fluid specially formulated to generate desired friction coefficient and durability for the subject clutch. As shown in FIGS. 2 and 3, the clutch-damper assembly 18 can also include a second clutch 28. The second clutch 28 is configured to selectively fix the third gear member 22-3 to the housing 20 and thereby provide a ratio shift within the clutch-damper assembly 18. The second clutch 28 can be configured either as a one-way, mechanically overrunning clutch, a mechanical diode, or a wet or dry friction-element clutch. Accordingly, the second clutch 28 can operate as a brake. Accordingly, as shown in the lever diagrams shown in FIGS. 2 and 3, a first node A is an input from the power-source 14, the second node B is an output to the transmission 16, while the third node C is selectively grounded to the housing 20. The above configuration can provide an underdrive ratio and torque multiplication that a torque converter may otherwise provide in a conventional automatic transmission.

The clutch-damper assembly 18 can also include a third clutch 30. The third clutch 30 is configured to selectively connect the second gear member 22-2 through the elastic element 24 either to the first gear member 22-1 or the third gear member 22-3. The third clutch 30 can be configured to selectively connect the second gear member 22-2 through the elastic element 24 to the first gear member 22-1. Although not shown, each of the first, second, and third clutches 26, 28, and 30, can be configured as any appropriate selectable torque retention device, such as a single- or multi-plate wet or dry friction assembly, or a band brake. As shown in FIG. 3, the clutch-damper assembly 18 may additionally include an inertial element 32. As shown, the inertial element 32 is connected to the third gear member 22-3. The inertial element 32 can be configured as a mass having a predetermined value sufficient to attenuate an excitation of the third gear member 22-3 in response vibrations coming from the power-source 14 during specific operating modes of the powertrain 12. The torsional inertia of the inertial element 32 can be in a range of 0.003-0.005 kg m$^2$.

Figure 4:
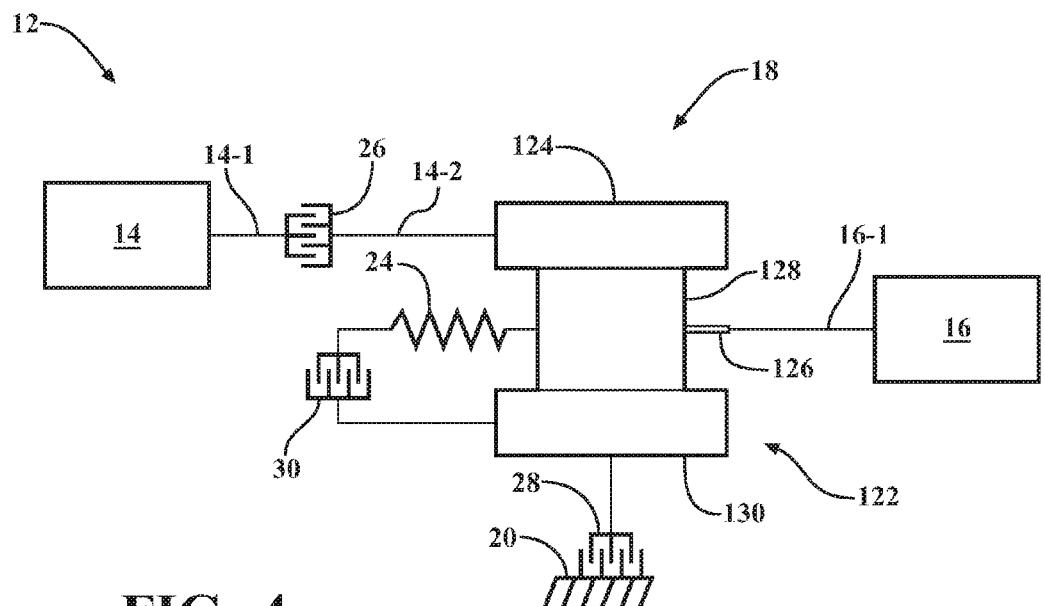
FIG. 4 is a schematic illustration of a specific embodiment of the clutch-damper assembly shown in FIG. 2.
Figure 5:
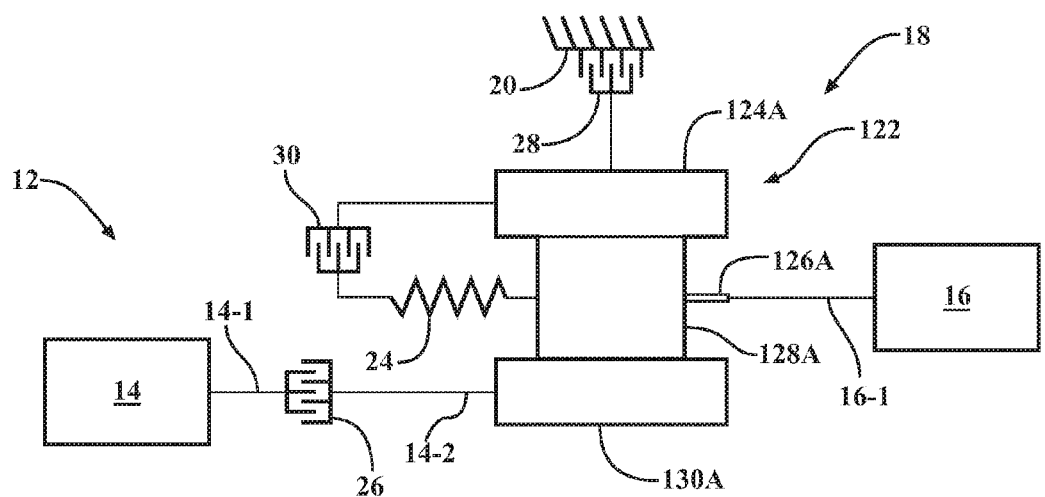
FIG. 5 is a schematic illustration of another specific embodiment of the clutch-damper assembly shown in FIG. 2.

As shown in FIG. 4, in an embodiment 122 of the planetary gear-set 22 shown in each of the FIGS. 2 and 3, the first gear member 22-1 can be configured as a ring gear 124. In such an embodiment of the planetary gear-set 22, the second gear member 22-2 can be configured as a planetary gear-set carrier 126 having a single set of pinion gears 128, i.e., a simple planetary gear-set. Furthermore, in the same embodiment, the third gear member 22-3 will then be configured as a sun gear 130. All the subject pinion gears 128 in such an embodiment are mounted on a common pitch circle to the gear-set carrier 126 and configured to rotate around the third gear member 22-3 configured as the sun gear 130. In the embodiment shown in FIG. 4, a ratio of a number of teeth of the ring gear to a number of teeth of the sun gear can be in a range of about 1.5-2.0 providing an underdrive speed ratio in the range of 1.5-1.7 for useful torque multiplication during launch of the vehicle 10 from rest. As shown in FIG. 4, the ring gear 124 embodiment of the first gear member 22-1 can be continuously connected, such as splined, to a shaft 14-2 that is in turn selectively connected to the output 14-1 of the power-source 14 via the first clutch 26. Additionally, the planetary gear-set carrier embodiment of the second gear member 22-2 can be continuously connected or splined to the input 16-1 of the transmission 16. Alternatively, as shown in FIG. 5, in the simple planetary gear-set construction of the gear set 22, the first gear member 22-1 can be configured as a sun gear 130A, the second gear member 22-2 can be a planetary gear-set carrier 126A having a single set of pinion gears 128A, and the third gear member 22-3 can be a ring gear 124A to generate a distinct underdrive speed ratio.

Figure 6:
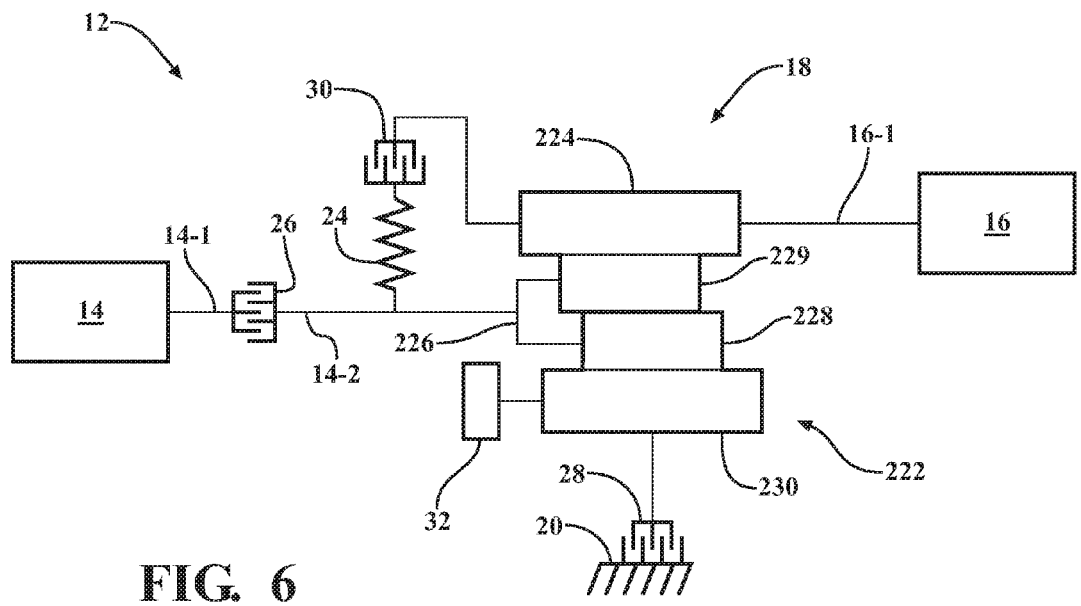
FIG. 6 is a schematic illustration of a specific embodiment of the clutch-damper assembly shown in FIG. 3.

As in FIG. 6, in a separate embodiment 222 of the planetary gear-set 22 shown in FIG. 3, the first gear member 22-1 can be a planetary gear-set carrier 226 having a double-pinion gear construction, i.e., include a set of pinion gears 228 and a set of pinion gears 229. The second gear member 22-2 can be a ring gear 224, and the third gear member 22-3 can be a sun gear 230. Specifically, the first gear member 22-1 configured as the planetary carrier 226 can be configured to hold two pinion gear sets, a set 228 having inner pinion gears and a set 229 having outer pinion gears 229 on distinct concentric pitch circles relative to the third gear member 22-3 configured as the sun gear 230. The set 228 of inner pinion gears meshes with the third gear member 22-3 configured as the sun gear 230 and the set 229 of outer pinion gears meshes with the second gear member 22-2 configured as the ring gear 224. Additionally, the individual sets 228 and 229 of pinion gears are intermeshed, and, therefore, drive one another.

Figure 7:
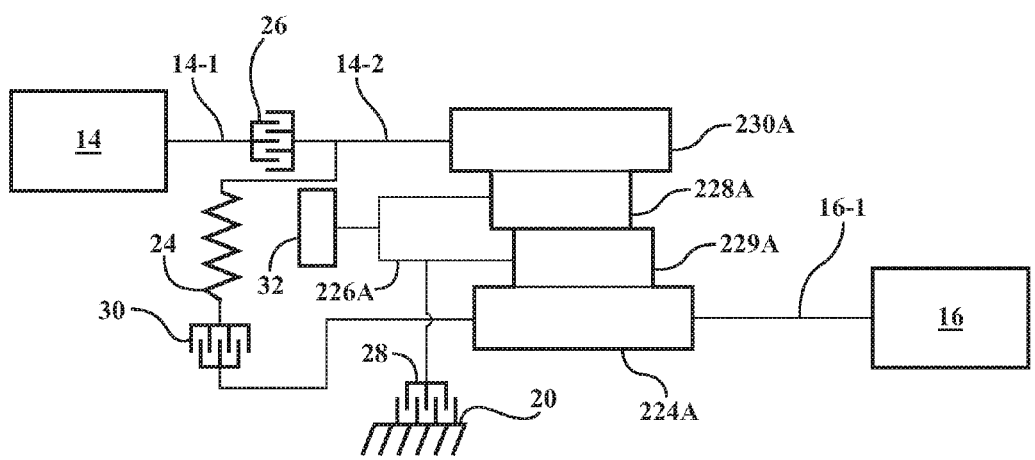
FIG. 7 is a schematic illustration of another specific embodiment of the clutch-damper assembly shown in FIG. 3.

In the embodiment of FIG. 6, the teeth ratio of the meshed pinion gears of the sets 228, 229 fixes the relative angular velocities of the subject pinion gears in that pair. Because the first gear member 22-1 configured as the planetary gear-set carrier 226 contains two planet gear sets 228, 229, the double-pinion planetary gear construction changes the relative rotational speeds of the ring gear 224 and sun gear 230, as compared with the embodiments of FIGS. 4 and 5. In the embodiment shown in FIG. 6, a ratio of a number of teeth of the ring gear to a number of teeth of the sun gear can be in a range of 2.4-3.0 providing an underdrive speed ratio in the range of 1.7-1.5 for useful torque multiplication during launch of the vehicle 10 from rest. In such an embodiment, the planetary gear-set carrier 226 can be continuously connected, such as splined, to the shaft 14-2 that is in turn selectively connected to the output 14-1 of the power-source 14 via the first clutch 26. Furthermore, the ring gear 224 embodiment of the second gear member 22-2 can be continuously connected or splined to the input 16-1 of the transmission 16. Alternatively, as shown in FIG. 7, in the double-pinion construction of the planetary gear-set 22, the first gear member 22-1 can be a sun gear 230A, the second gear member 22-2 can be a ring gear 224A, and the third gear member 22-3 can be a planetary gear-set carrier 226A having a set of pinion gears 228A and a set of pinion gears 229A to generate a distinct underdrive speed ratio.

According to the disclosure, the clutch-damper assembly 18 is configured to provide an advantageous torque multiplication factor to assist the powertrain 12 in overcoming inertia of the vehicle 10 and its cargo for launching the vehicle from rest. Additionally, the clutch-damper assembly 18 is configured to reduce transmission of torsional vibration in a path between the power-source 14 and the transmission 16. In operation, the vehicle 10 can be initially launched by the power-source 14 through the clutch-damper assembly 18 via engaging the first clutch 26. The second clutch 28 can be engaged to selectively fix the third gear member 22-3 to the housing 20 and thereby provide the above-described 1.5-1.7 torque multiplication within the clutch-damper assembly 18 during vehicle launch. For the above-noted torque multiplication to be affected during vehicle launch, the third clutch 30 will be disengaged.

Throughout operation of the clutch-damper assembly 18 after the launch, the third clutch 30 can be employed to selectively connect the second gear member 22-2 and the elastic element 24 either to the first gear member 22-1, as shown in the embodiment of FIG. 3, or to the third gear member 22-3, as shown in the embodiment of FIG. 2. Along with engagement of the third clutch 30, the second clutch 28 can be simultaneously disengaged to execute a clutched or freewheeler-to-clutch shift to change from the described underdrive torque multiplication ratio to the direct drive mode, i.e., 1:1 ratio. Once the direct drive mode is selected in the clutch-damper assembly 18, filtering or damping of the above-noted vibrations and torque oscillations in the powertrain 12 via the elastic element 24 can be affected.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A multi-speed clutch-damper assembly for selectively connecting an output of a power-source to an input of a multi-speed transmission, the multi-speed clutch-damper assembly comprising:
    a planetary gear-set encased in a housing and configured to provide two selectable speed ratios and a damper between the output of the power-source and the input of the multi-speed transmission, the planetary gear-set having:
        a first gear member;
        a second gear member configured to be connected to the input of the multi-speed transmission; and
        a third gear member configured to be selectively fixed to the housing;
    an elastic element operatively connected to the second gear member and configured to generate torsional vibration damping between the output of the power-source and the input of the multi-speed transmission;
    a first clutch configured to selectively connect the output from the power-source to the first gear member for transmitting torque of the power-source to the multi-speed transmission; and
    a second clutch configured as one of a mechanical diode and a one-way clutch to selectively fix the third gear member to the housing.

2. The multi-speed clutch-damper assembly according to claim 1, further comprising a third clutch configured to selectively connect the second gear member and the elastic element to one of the first and third gear members through the elastic element.

3. The multi-speed clutch-damper assembly according to claim 2, wherein the third clutch is configured to selectively connect the second gear member and the elastic element to the first gear member through the elastic element, the clutch-damper assembly further comprising an inertial element connected to the third gear member.

4. The multi-speed clutch-damper assembly according to claim 1, wherein the first gear member is a ring gear, the second gear member is a planetary gear-set carrier, and the third gear member is a sun gear.

5. The multi-speed clutch-damper assembly according to claim 4, wherein a ratio of a number of teeth of the ring gear to a number of teeth of the sun gear is in a range of about 1.5-2.0 configured to provide an underdrive speed ratio in a range of 1.5-1.7 for torque multiplication.

6. The multi-speed clutch-damper assembly according to claim 1, wherein the first gear member is a sun gear, the second gear member is a planetary gear-set carrier, and the third gear member is a ring gear.

7. The multi-speed clutch-damper assembly according to claim 1, wherein the planetary gear-set includes a double-pinion construction, and wherein the first gear member is a planetary gear-set carrier, the second gear member is a ring gear, and the third gear member is a sun gear.

8. The multi-speed clutch-damper assembly according to claim 1, wherein the planetary gear-set includes a double-pinion construction, and wherein the first gear member is a planetary a sun gear, the second gear member is a ring gear, and the third gear member is gear-set carrier.

9. A vehicle comprising:
    a power-source configured to generate a power-source torque;
    a multi-speed transmission configured to transmit the power-source torque to propel the vehicle;
    a multi-speed clutch-damper assembly configured to selectively connect an output of the power-source to an input of the multi-speed transmission, the multi-speed clutch-damper assembly including:
        a planetary gear-set encased in a housing and configured to provide two selectable speed ratios and a damper between the output of the power-source and the input of the multi-speed transmission, the planetary gear-set having:
            a first gear member;
            a second gear member configured to be connected to the input of the multi-speed transmission; and
            a third gear member configured to be selectively fixed to the housing;
        an elastic element operatively connected to the second gear member and configured to generate torsional vibration damping between the output of the power-source and the input of the multi-speed transmission;
        a first clutch configured to selectively connect the output from the power-source to the first gear member for transmitting torque of the power-source to the multi-speed transmission; and
        a second clutch configured as one of a mechanical diode and a one-way clutch to selectively fix the third gear member to the housing.

10. The vehicle according to claim 9, wherein the multi-speed clutch-damper assembly additionally includes a third clutch configured to selectively connect the second gear member and the elastic element to one of the first and third gear members through the elastic element.

11. The vehicle according to claim 10, wherein the third clutch is configured to selectively connect the second gear member and the elastic element to the first gear member through the elastic element, the clutch-damper assembly further comprising an inertial element connected to the third gear member.

12. The vehicle according to claim 9, wherein the first gear member is a ring gear, the second gear member is a planetary gear-set carrier, and the third gear member is a sun gear.

13. The vehicle according to claim 12, wherein a ratio of a number of teeth of the ring gear to a number of teeth of the sun gear is in a range of about 1.5-2.0 configured to provide an underdrive speed ratio in a range of 1.5-1.7 for torque multiplication during launch of the vehicle from rest.

14. The vehicle according to claim 9, wherein the first gear member is a sun gear, the second gear member is a planetary gear-set carrier, and the third gear member is a ring gear.

15. The vehicle according to claim 9, wherein the planetary gear-set includes a double-pinion construction, and wherein the first gear member is a planetary gear-set carrier, the second gear member is a ring gear, and the third gear member is a sun gear.

16. The vehicle according to claim 9, wherein the planetary gear-set includes a double-pinion construction, and wherein the first gear member is a planetary a sun gear, the second gear member is a ring gear, and the third gear member is gear-set carrier.

\* \* \* \* \*